United States Patent [19]

Starck

[11] Patent Number: 5,572,081
[45] Date of Patent: Nov. 5, 1996

[54] ACCELEROMETER

[75] Inventor: Lars Starck, Gilleleje, Denmark

[73] Assignee: A/S Bruel & Kjær, Denmark

[21] Appl. No.: 387,851

[22] PCT Filed: Oct. 7, 1993

[86] PCT No.: PCT/DK93/00329

§ 371 Date: Feb. 24, 1995

§ 102(e) Date: Feb. 24, 1995

[87] PCT Pub. No.: WO94/09373

PCT Pub. Date: Apr. 28, 1994

[30] Foreign Application Priority Data

Oct. 9, 1992 [DK] Denmark .................. 1238/92

[51] Int. Cl.$^6$ ................................. H01L 41/08
[52] U.S. Cl. ................................. 310/329
[58] Field of Search ................ 310/338, 339, 310/333, 329

[56] References Cited

U.S. PATENT DOCUMENTS

| | | | |
|---|---|---|---|
| 2,808,524 | 10/1957 | Feinstein | 310/329 X |
| 4,075,525 | 2/1978 | Birchall | 310/329 |
| 4,180,892 | 1/1980 | Jensen | 310/329 |
| 4,211,951 | 7/1980 | Jensen | 310/329 |
| 4,503,351 | 3/1985 | Sonderegger et al. | 310/329 |
| 4,941,243 | 7/1990 | Cleveland | 310/329 |

*Primary Examiner*—Mark O. Budd
*Attorney, Agent, or Firm*—Scully, Scott, Murphy & Presser

[57] ABSTRACT

An accelerometer of the shear type comprises a base (1) with uprights (2) supporting one or more seismic masses (3) by way of one or more piezoelectric elements (4). According to the invention, the seismic mass(es) (3) and the piezoelectric elements (4) are arranged between the uprights (2). The seismic masses (3) and the piezoelectric elements are clamped between the uprights (2) by means of a clamping ring (5). The resulting resonance frequency is very high, and the accelerometer is less sensitive to temperature transients, magnetic fields and easier to produce than the known accelerometers.

17 Claims, 9 Drawing Sheets

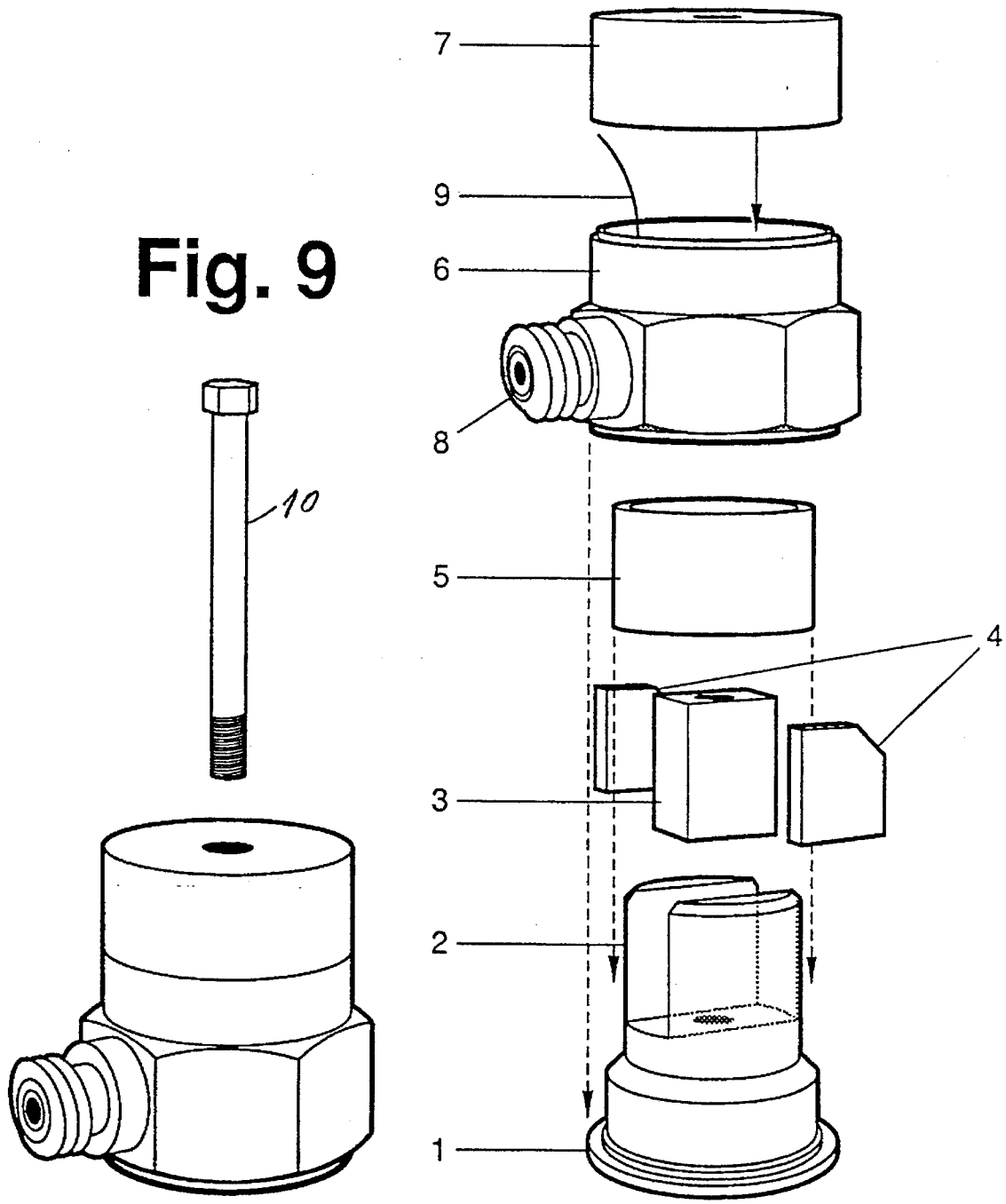

ACCELEROMETER

TECHNICAL FIELD

The invention relates to an accelerometer of the shear type and comprising a base with uprights supporting one or more seismic masses by way of one or more piezoelectric elements and a clamping ring or other securing means.

BACKGROUND ART

Mechanical dynamometers are often used for static and dynamic measurings of mechanical forces. The forces to be measured cause changes in the electrical charge, voltage, current or impedance in one or more measuring elements.

In a known accelerometer an acceleration of a seismic mass results in a mechanical force proportional to the acceleration. This force influences one or more measuring elements, such as tension or pressure-sensitive electrical resistances, semiconductors or piezoelectric elements, electrodynamic devices or other devices converting mechanical force into electrical energy.

These forces can imply a pressure, a tension or a displacement onto the measuring elements, and it has been found that piezoelectric accelerometers of the shear type can be structured to obtain advantageous properties, such as good linearity, low static and dynamic temperature sensitivity, low sensitivity to magnetic fields and a wide frequency range.

The known piezoelectric accelerometers comprise a base with an upright extending from the base. Piezoelectric elements and seismic masses are arranged on or around the upright.

Examples of piezoelectric accelerometers are 1) accelerometers of the compression type,
2) accelerometers of the "Ring shear" type, cf. U.S. Pat. No. 3,104,334,
3) accelerometers of the "Conical ring shear" type, cf. GB-PS No. 1,507,251,
4) accelerometers of the "Delta Shear" type, cf. DK-PS No. 131,401, and
5) accelerometers of the "Planar Shear" type, cf. DK-PS No. 138,768.

In an accelerometer of the "Ring shear" type, a base with a cylindrical upright is used, around which a cylindrical piezoelectric element is arranged, such as glued, said element comprising a cylindrical seismic mass secured to the outer cylindrical surface of the element. This rotational-symmetrical embodiment has inter alia the result that the elements of the accelerometer can be manufactured in an inexpensive and accurate manner by way of turning and grinding, and that the sensitivity of the accelerometer towards acceleration in a plane perpendicular to the axis is low. This embodiment is, however, encumbered with the drawback that it is difficult to obtain a sufficient strength and thermal stability in the connection between the cylindrical elements, and that the different temperature expansion coefficients of said elements cause undesired mechanical stresses which may affect the measuring results.

An accelerometer of the "Planar Shear" type employs two plane piezoelectric elements secured on the opposing broad sides of a prismatic upright of a rectangular cross section. The elements are secured to the upright by means of a clamping ring, whereby problems of different temperature expansion coefficients are avoided. This accelerometer generates, however, different transverse resonances in different directions, perpendicular to the axis of the prism as said resonances may be lower than the resonances of the cylindrical embodiment.

An accelerometer of the "Delta Shear" type employs a prism with a plurality of measuring elements arranged on the sides of said prism. A shear deformation is caused by the forces to be measured. The prism is of a cross section in form of a regular polygon, a plurality of identical piezoelectric elements being arranged on the sides of the polygon and retained with the seismic masses on the surfaces of said prism by means of a clamping ring. The resulting transverse resonance is substantially the same in all directions. This embodiment is, however, encumbered with the drawback that the upright is difficult to manufacture and join to the base when all the dimensions are small.

A fourth embodiment comprises a base provided with a cylindrical upright with a cylindrical opening. A cylindrical piezoelectric element is arranged in this opening and comprises in turn a cylindrical opening in which the seismic mass is mounted, cf. PCT/SU/00272. This embodiment is encumbered with the drawback that it is difficult to guide the signal conduit to the seismic mass, to which it is to be secured. Another drawback is the securing of the piezoelectric element to the inner side of the cylindrical upright as well as the securing of the seismic mass to the piezoelectric element. These operations are difficult to perform without the use of conductive glue or another binder, whereby the temperature range in which the accelerometer can be used is considerably reduced.

BRIEF DESCRIPTION OF THE INVENTION

The object of the invention is to provide an accelerometer which is less expensive to manufacture than the hitherto known accelerometers, and which simultaneously have better specifications than the previously known accelerometers.

An accelerometer of the above type is according to the invention characterised by the seismic mass(es) and the piezoelectric elements being arranged between the uprights, whereby a very high resonance frequency is obtained. The seismic masses and the piezoelectric elements are mounted between the uprights and clamped therebetween by means of a clamping ring. As a result the accelerometer is less sensitive to temperature transients than the known accelerometers, and compared thereto the accelerometer is furthermore easier to manufacture and better suited for mass production, which reduces the production costs.

The uprights may either be formed directly in the base or joined thereto by way of screwing, welding, soldering or the like. A plurality of piezoelectric elements are arranged between the inner sides of the uprights. One or more seismic masses are arranged between these piezoelectric elements.

In order to facilitate the mounting of the piezoelectric elements and the seismic masses, the space between the uprights may be slightly wedge-shaped.

The piezoelectric elements may be arranged with vertical and/or horizontal polarization directions, whereby the same accelerometer can register motion in several directions perpendicular to one another.

A clamping ring may be used for clamping the elements between the uprights, said clamping ring being pressed, shrinked or secured in another manner onto the outer side of the uprights. In this manner a shielding from external electromagnetic fields is simultaneously provided. The elements may alternatively be secured by means of a screw connection through the uprights, the piezoelectric elements, and the seismic masses, or by means of glue.

In addition to the above parts, the accelerometer may comprise a cylindrical housing or cover and an outlet for electrical connections.

According to a simplified embodiment, the accelerometer may be top-suspended whereby the housing is formed as a clamping ring.

The accelerometer according to the invention presents several advantages compared to the known accelerometers, such as 1. a lower, static temperature sensitivity
2. a lower dynamic temperature sensitivity (sensitivity to temperature shocks)
3. a lower sensitivity to magnetic fields
4. an improved linearity
5. a larger frequency range
6. a higher transverse resonance frequency, and
7. lower production costs.

BRIEF DESCRIPTION OF THE DRAWINGS

The invention is described in greater detail below with reference to the accompanying drawings, in which FIGS. 7 to 11 illustrate alternative embodiments of the accelerometer.

BEST MODE FOR CARRYING OUT THE INVENTION

Figures 1, 2:
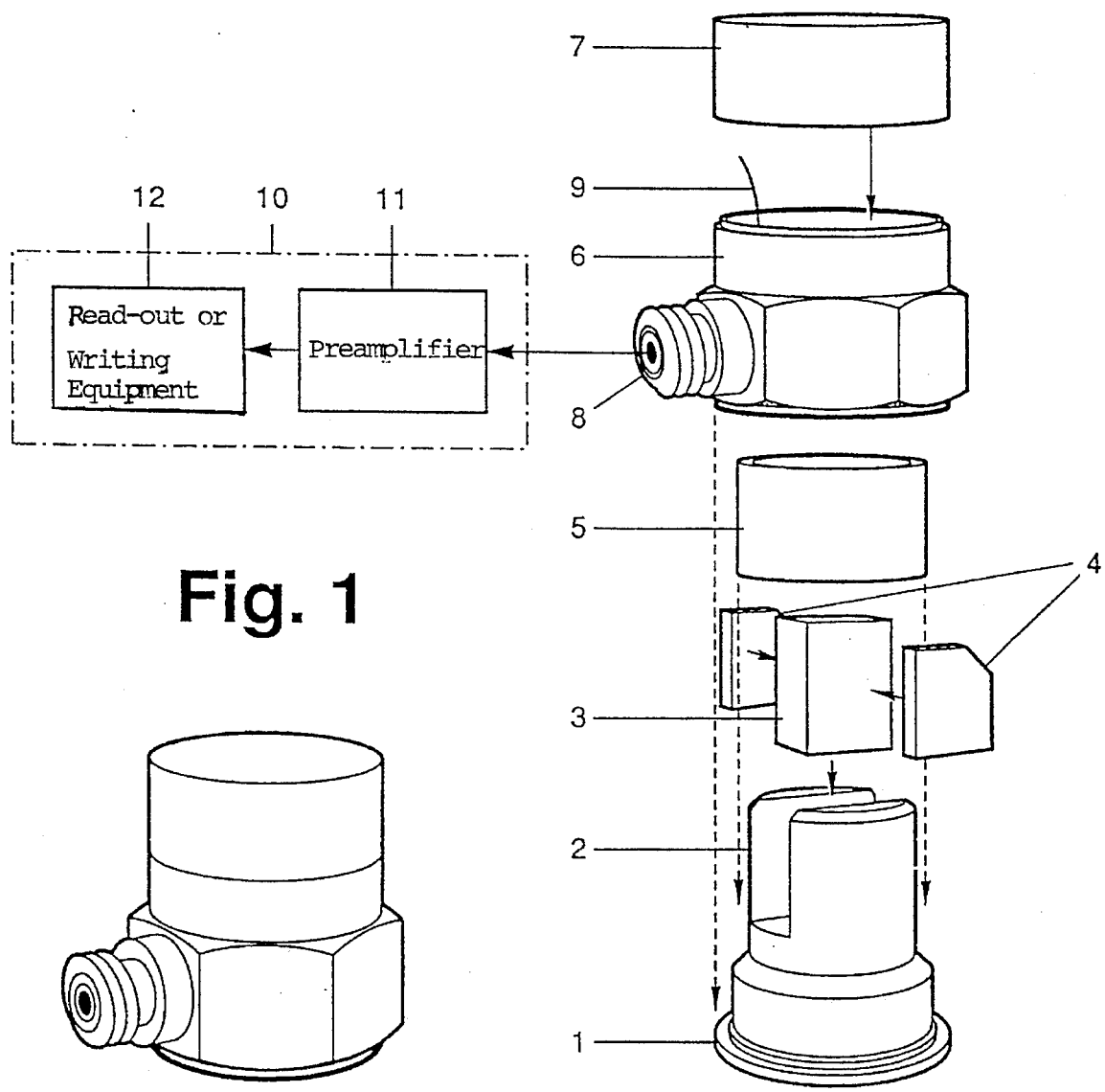
FIG. 1 illustrates an accelerometer according to the invention.
FIG. 2 is an exploded view of the accelerometer of FIG. 1 and the associated electric equipment.

The accelerometer of FIGS. 1 and 2 comprises a substantially cylindrical base with two uprights 2. The uprights are of a cross section in form of a segment of a circle and have plane and substantially parallel inner sides. The uprights 2 may be formed integral with the base 1. Piezoelectric elements 4 are placed on the inner sides of the uprights 2, and one or more seismic masses 3 of a rectangular cross section are placed between the piezoelectric elements 4. The elements are clamped between the uprights 2, and the uprights 2 are interconnected by means of a clamping ring 5 surrounding said uprights 2. The clamping ring 5 is of substantially the same height as the uprights 2, but may optionally be higher. The clamping ring 5 may furthermore be shaped as a cover, whereby it can protect the piezoelectric elements 4 and the seismic masses 3 against electromagnetic fields. The clamping ring 5 is surrounded by a housing 6 with a hexagonal outer surface. The housing 6 is secured to the base 1. The housing 6 is provided with a coaxial outlet 8, the inner lines 9 of which communicate with the seismic mass 3. A cover 7 is placed on top of the housing 6. The accelerometer is electrically connected to a measuring equipment 10 including an amplifier 11 and a read-out or writing equipment 12.

The above embodiment is suited for automatic mounting as it is possible to insert the piezoelectric elements 4 and the seismic masses between the upright 2 either from the top or from the side. The mounting procedure can be facilitated by shaping the inner sides of the uprights 2 slightly wedge-shaped. The wedge angle can for instance be 1° to 3°.

This accelerometer is further advantageous because the piezoelectric elements are not being subjected to a shear stress during the mounting procedure. Such a shear stress may imply that the accelerometer does not satisfy the prescribed specifications.

The above parts can be assembled by known welding methods. As a result a hermetically tight accelerometer is obtained without the use of sealing means.

Figure 3:
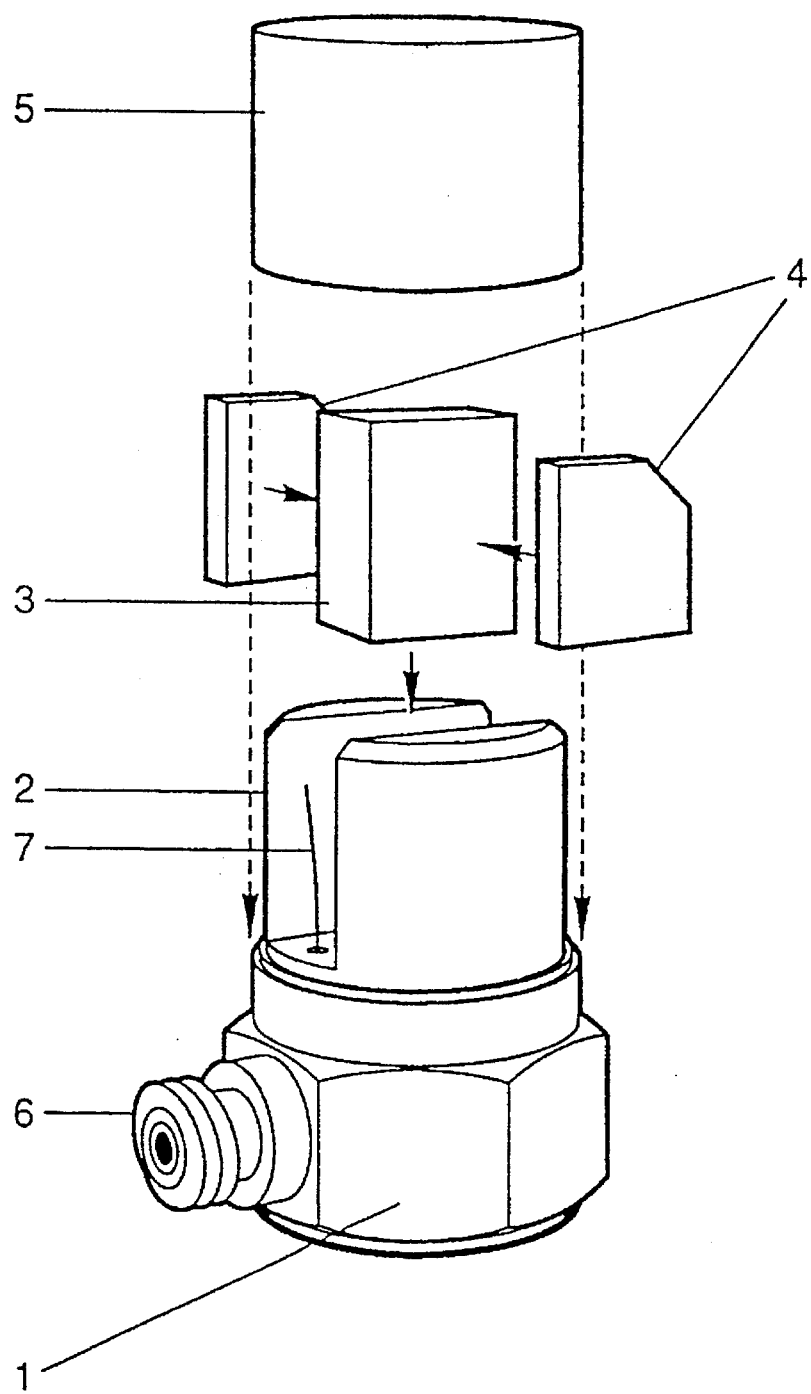
FIG. 3 is an exploded view of a second embodiment of an accelerometer with a clamping ring shaped as a cover.

FIG. 3 illustrates an embodiment with the same properties as the embodiment of FIG. 2. The embodiment of FIG. 3 has, however, been simplified. It comprises a hexagonal base 1 with two uprights 2 of a segmental cross section. A piezoelectric element 4 is placed on the inner sides of the uprights 2, and a seismic mass 3 of a rectangular cross section is placed between said piezoelectric elements 4. The elements are clamped between said uprights 2 interconnected by means of a clamping ring 5 formed as a cover. The hexagonal base 1 is provided with a coaxial outlet 6 for electric equipment through a coaxial cable. The coaxial outlet 6 comprises an inner line 7 connected to the seismic mass 3.

Figure 4:
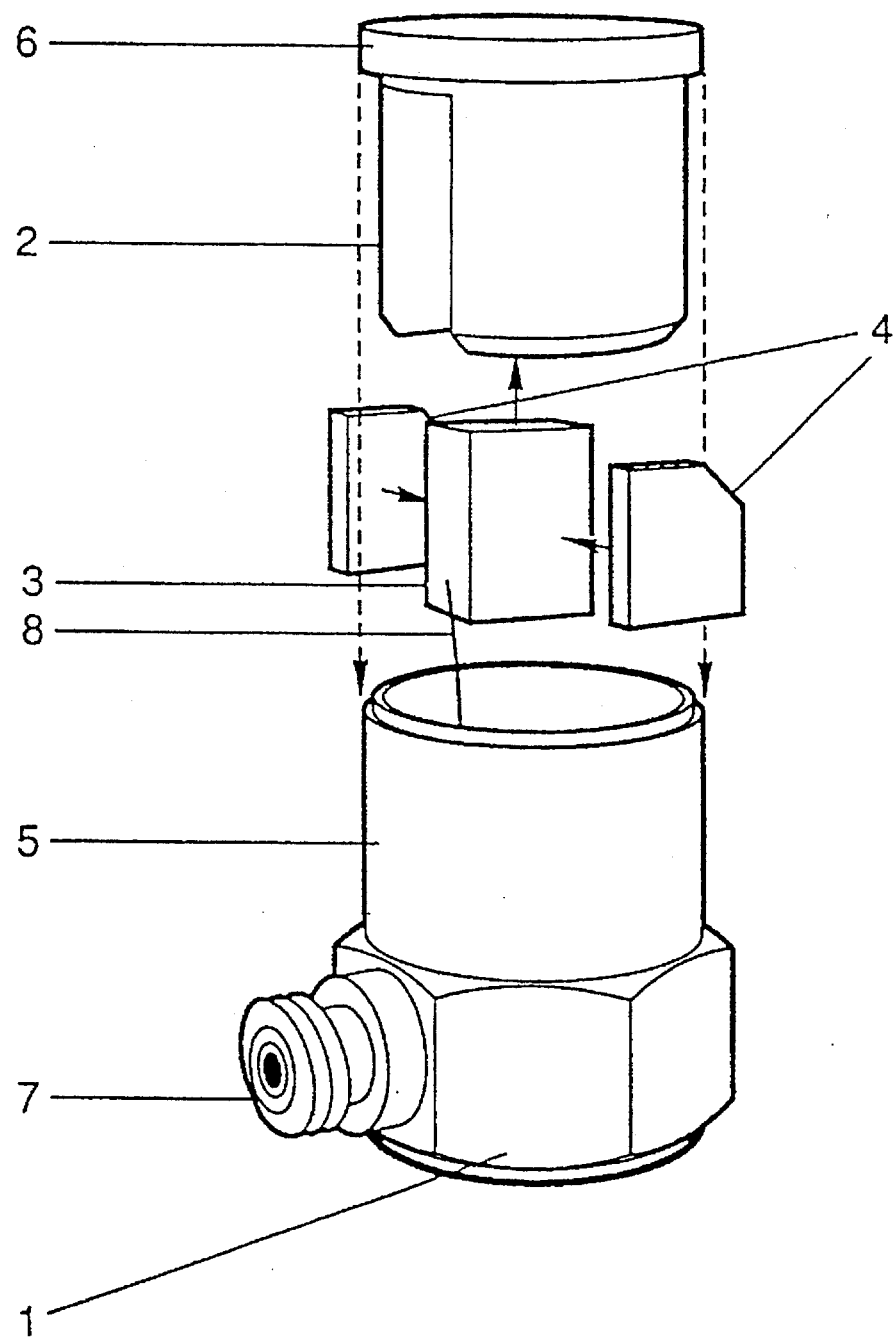
FIG. 4 is an exploded view of a third embodiment of an accelerometer top-suspended with a housing serving as clamping ring.

FIG. 4 illustrates an embodiment comprising a hexagonal base 1 with a cylindrical housing 5 forming the clamping ring. The cylindrical housing 5 interconnects the piezoelectric elements 4 and the seismic masses 3 placed between the uprights 2 which form a portion of a cover plate 6. Like the previous embodiments, the uprights 2 are of a segmental cross section. The hexagonal base 1 can be provided with a coaxial outlet for associated electric equipment. The inner line 8 of the coaxial outlet is connected to the seismic mass 3. This embodiment has a particularly low base bending sensitivity.

Both embodiments of FIGS. 3 and 4 have been further simplified. As a result the costs are further reduced.

Figure 5:
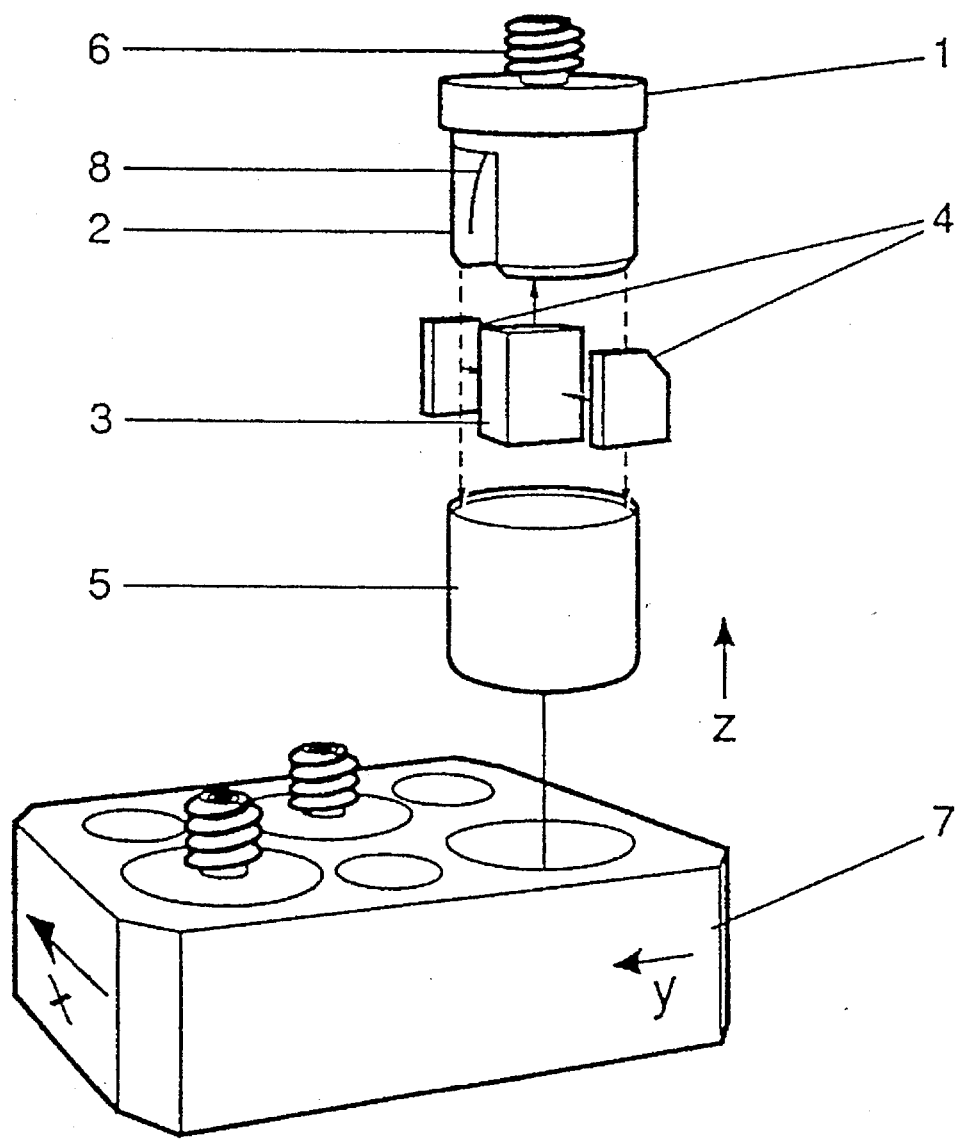
FIG. 5 illustrates an arrangement of several accelerometers sensitive in different directions.

FIG. 5 illustrates an arrangement of three accelerometers for measuring vibrations in three directions perpendicular to one another. Each accelerometer comprises a base 1 with two uprights 2. A plurality of piezoelectric elements 4 and seismic masses 3 are placed between the uprights 2. These means are clamped between the uprights 2, and the uprights 2 are surrounded by a clamping ring 5 formed as a cover. The base 1 is provided with a coaxial outlet 6 comprising an outlet line 8 connected to the seismic mass 3. The associated electric equipment is connected to the coaxial outlet 6, Each accelerometer is mounted in a bore of a block 7. The bores can be provided in the same side of the block 7, whereby it is possible to place the coaxial outlets 6 on the same side, which can be of great practical importance. The sensitivity in the X, Y, and Z-direction, respectively, is obtained by mounting the piezoelectric elements 4 with their polarization directions perpendicular to the longitudinal axis of the uprights 2 and subsequently by turning one of the accelerometers 90° relative to the succeeding accelerometer during the mounting in the block 7. In the third accelerometer, the piezoelectric elements 4 are mounted with their polarization directions parallel to the longitudinal axes of the uprights 2. The illustrated embodiment can be used without the housing 7.

Figure 6:
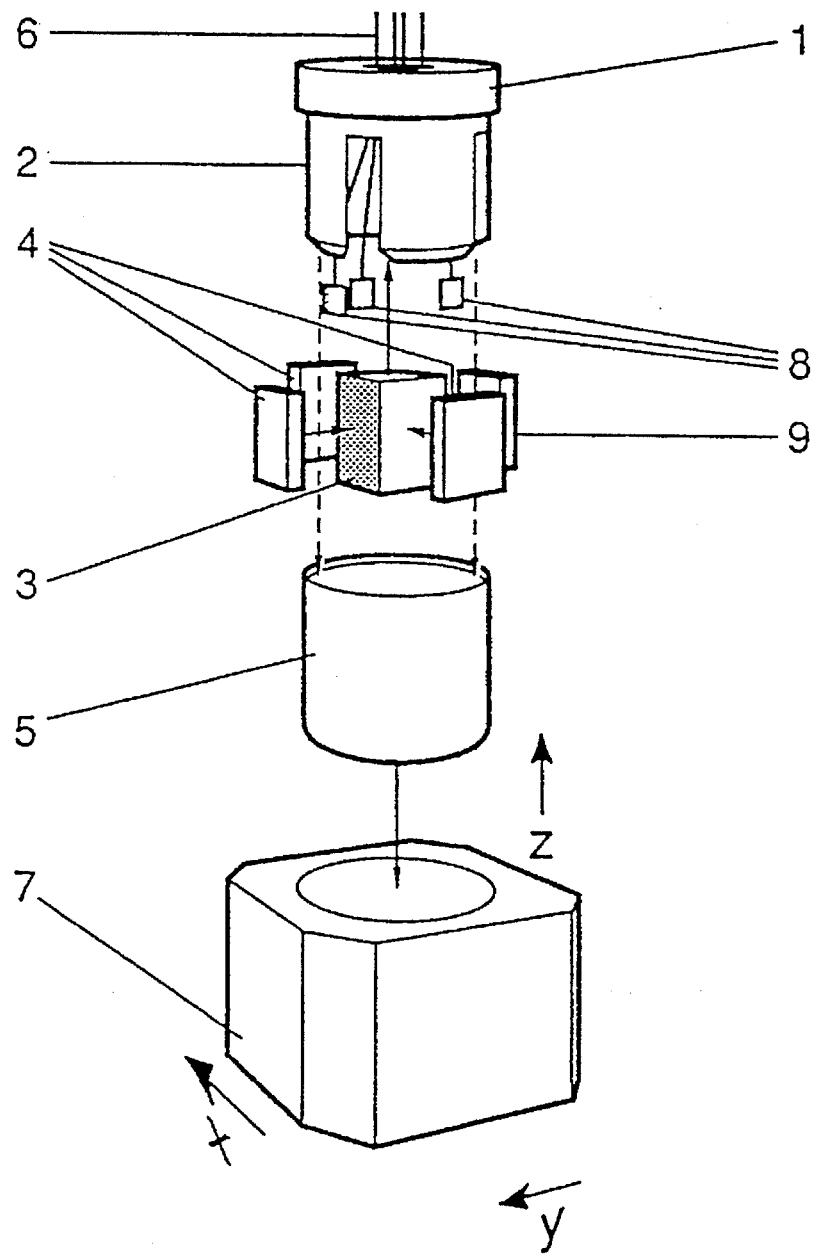
FIG. 6 illustrates a compact embodiment of a triaxial accelerometer.

FIG. 6 illustrates a rather compact embodiment of a triaxial accelerometer. This accelerometer comprises a seismic mass 3, three piezoelectric elements 4 being arranged around said seismic mass with their polarization directions in three directions perpendicular to one another, as well as a dummy unit 9. These means are placed between four uprights 2 extending from a base 1. The electric connection between the piezoelectric elements 4 and the multipolar outlet 6 comprises contact plates 8 isolated from the seismic mass 3 and arranged between said seismic mass and the piezoelectric elements 4. The elements are clamped between the uprights 2 surrounded by a clamping ring 5 optionally formed as a cover shielding against outer electromagnetic fields. The triaxial accelerometer can optionally be placed in a bore in a block 7. The accelerometer can be provided with a multipolar outlet 6 for the connection of associated electric measuring equipment.

Figure 7:
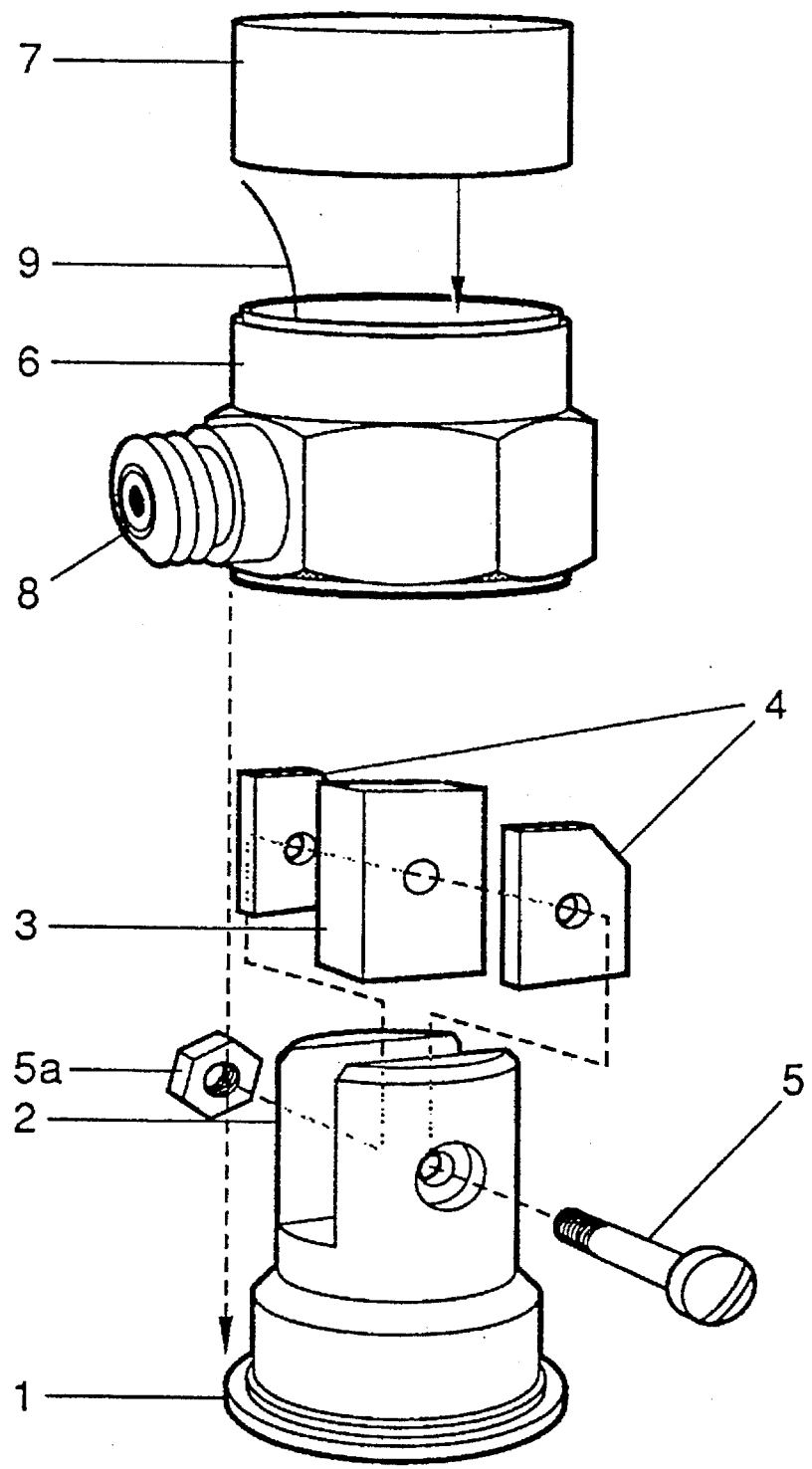

FIG. 7 shows an accelerometer structured substantially like the accelerometer of FIG. 2. The clamping ring of FIG. 2 has been replaced by a bolt extending through the uprights and on the opposite side provided with a nut 5a for compressing the uprights. The nut 5a can be omitted provided the opening in one upright is provided with a thread.

Figure 8:
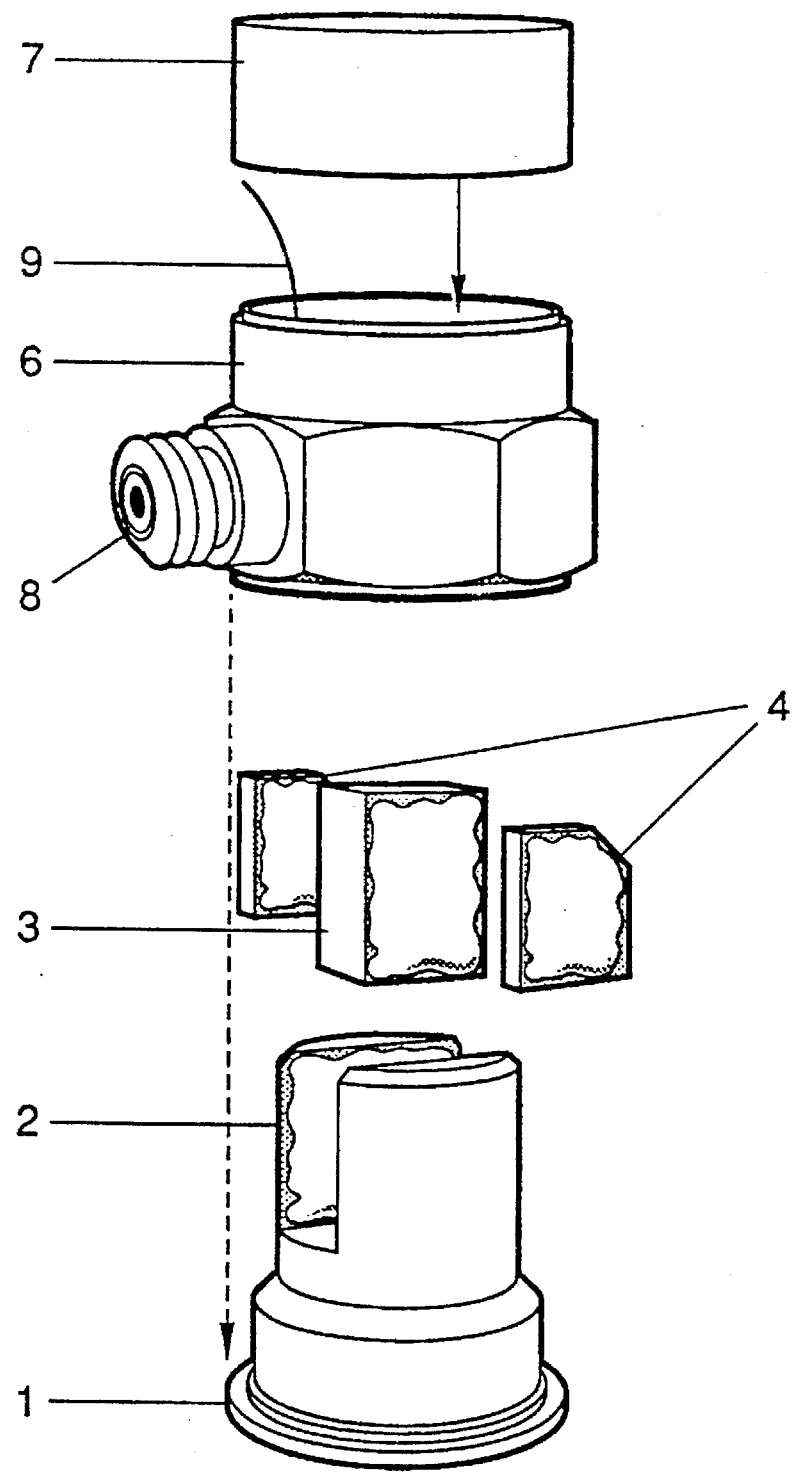

FIG. 8 illustrates an accelerometer structured substantially like the accelerometer of FIG. 2. The clamping ring of FIG. 2 has been replaced by a glue retaining the piezoelectric elements 4 and the seismic mass 3 between the uprights 2.

FIGS. 9 and 10 illustrate the assembled and disassembled, respectively, state of an additional accelerometer structured substantially like the accelerometer of FIGS. 1 and 2. The seismic mass 3 is provided with a through bore. The cover 7 and the cylindrical base 1 are also provided with a through hole. This accelerometer can be mounted on the measuring site by means of a through bolt 10. As a result, it is possible to orient the coaxial outlet 8 in a desired angular position.

Figure 11:
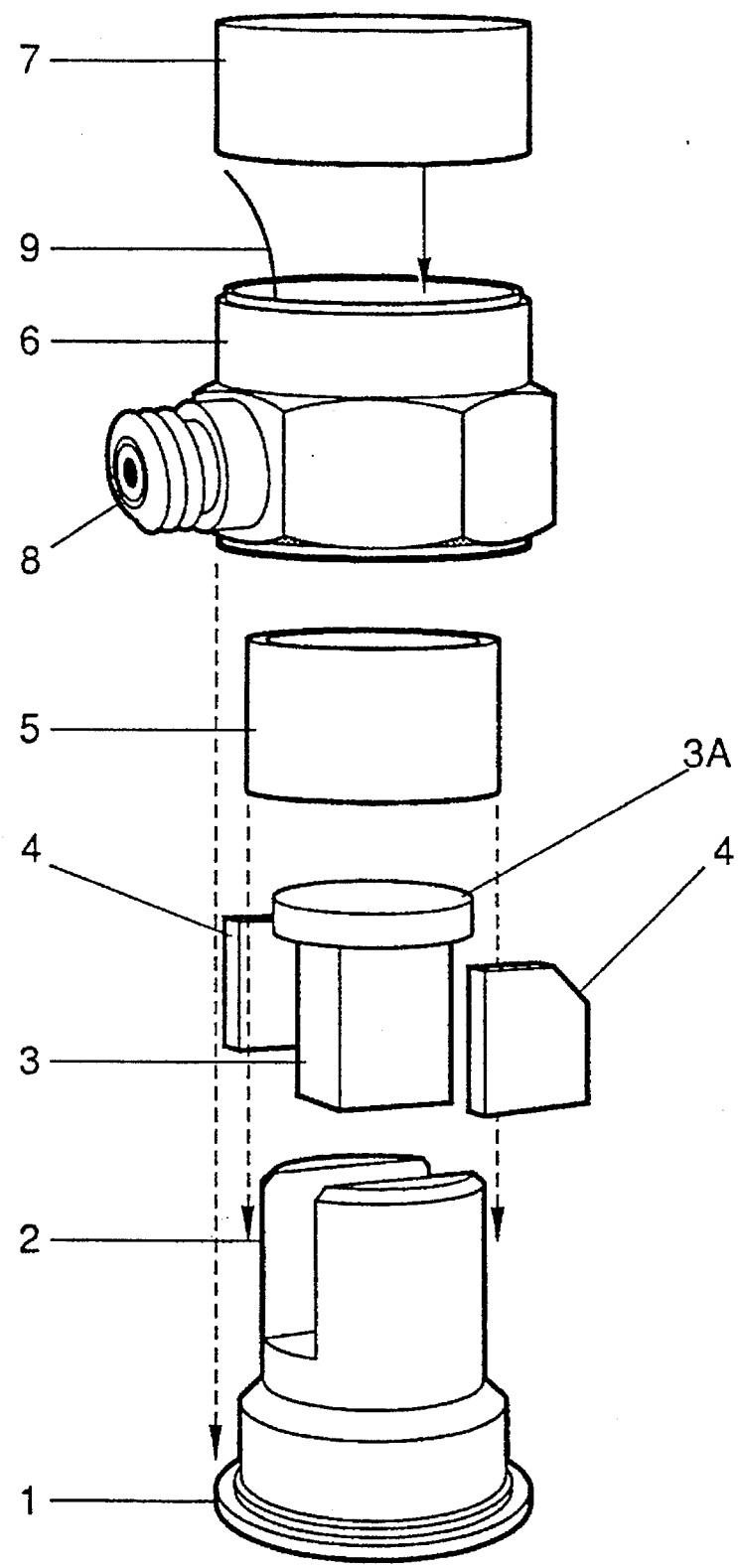

FIG. 11 illustrates an accelerometer also structured substantially like the accelerometer of FIG. 2. The seismic mass 3 is provided with a top plate 3A either formed integral with the seismic mass 3 or secured thereto in another manner. The top plate 3A increases the weight of the seismic mass. As a result, the sensitivity of the accelerometer is increased within the physical limits shown in FIG. 10. The top plate 3A may furthermore be used for securing a preamplifier, for instance by means of a glue.

The illustrated embodiments are suited for measuring acceleration of linear movements, and the piezoelectric elements are mounted with their polarization directions parallel to the longitudinal axes of the uprights or in three directions perpendicular to one another.

The accelerometer is secured to the body, the acceleration of which is to be measured, and follows the movements of the body. As a result thereof, inertial forces arise between the uprights 2, the piezoelectric elements, and the seismic mass, said inertial forces being proportional to the mass and the acceleration of the base.

The forces generated by the acceleration in the axial direction of the accelerometer cause a shear deformation of the piezoelectric elements, whereby an electric charge proportional to the acceleration is generated. This charge can be measured by means of the associated electric equipment, such as a preamplifier 11 and a display, for instance in form of a writing equipment 12.

Forces caused by an acceleration perpendicular to the polarization direction of the piezoelectric elements only generate charges when the surfaces are not completely parallel to the polarization directions of the piezoelectric elements or when the polarization directions in the piezoelectric elements are not completely parallel to the axial direction.

Compared to the known accelerometers, the accelerometer according to the invention possesses a lower static and dynamic temperature sensitivity, a lower sensitivity to magnetic fields, an improved linearity, a larger frequency range, and a higher transverse resonance frequency. In addition, the production costs are lower.

The above is supported by the following Table with comparing measuring results provided by ANSI (American National Standards Institute Inc.) norm S. 2.11-1967: (Selection of Calibrations and Tests for Electrical Transducers used for Measuring Shock and Vibration). The parameters, the measuring methods, and the measuring tables to be used are indicated.

The following Table is a comparison of measuring results of three different accelerometers, where the improved properties of the described accelerometer compared to other known accelerometers appear.

TABLE

| Type:<br>Structure: | | Endevco 7201 M2<br>Iso Shear | B&K 4371<br>Delta Shear | B&K Inverted<br>acc. to the Inv.<br>Planar Shear |
|---|---|---|---|---|
| Charge<br>sensitivity | $pC/ms^{-2}$<br>pc/g | NS<br>$10 \pm 2\%$ | $1 \pm 2\%$<br>9.8 | $1 \pm 2\%$<br>9.8 |
| Mounted Resonance Frequency | KHz | 48 | 42 | 50 |
| Transverse Resonance Frequency | KHz | 25 | 15 | >48 |
| Frequency Range 5% | KHz | 2 Hz–9.8 KHz | 0.2 HZ–9.1 KHz | 0.2 Hz–10.2 KHz |
| Frequency Range 10% | KHz | 0.1 Hz–16 KHz | 0.1 Hz–13 KHz | 0.1 Hz–16.7 KHz |
| Typ: Undamped natural Frequency | KHz | NS | 65 | 80 |
| Typ: Temperature Sensitivity | %/°C. | 0.09 | 0.07 | 0.07 |
| Typ: Temp. Transiency | $ms^{-2}$/°C. | 0.05 | 0.4 | 0.02 |

TABLE-continued

| Type:<br>Structure: | | Endevco 7201 M2<br>Iso Shear | B&K 4371<br>Delta Shear | B&K Inverted<br>acc. to the Inv.<br>Planar Shear |
|---|---|---|---|---|
| Sensitivity | | | | |
| Typ: Magnetic<br>Sensitivity | $ms^{-2}/T$<br>g/Kgauss | 2<br>0.02 | 4<br>0.04 | <0.7<br><0.007 |
| Weight: | Gramm | 15 | 11 | 11 |

I claim:

1. An accelerometer comprising a base with at least two uprights supporting at least one seismic mass and at least one piezoelectric element, and a securing means for securing said seismic masses and said piezoelectric elements to an inner side of each of said uprights.

2. An accelerometer as claimed in claim 1, wherein said inner sides are positioned substantially parallel to each other.

3. An accelerometer as claimed in claim 1, wherein said at least one seismic mass has a rectangular cross-sectional shape.

4. An accelerometer as claimed in claim 1, wherein said inner sides are positioned at an angle with respect to each other, said angle being from about 1° to about 3°.

5. An accelerometer as claimed in claim 1, wherein said at least two uprights are formed integral with the base.

6. An accelerometer as claimed in claim 1, wherein each of said piezoelectric elements has a polarization direction which is parallel to and/or perpendicular to the uprights.

7. An accelerometer as claimed in claim 1 wherein said at least one piezoelectric element and said at least one seismic mass are retained between said inner sides of said uprights by said securing means which exerts a pressure on an outer side of each of said uprights, said pressure being directed towards the inner side of each of said uprights.

8. An accelerometer as claimed in claim 7, wherein said securing means is a clamping ring which surrounds said uprights.

9. An accelerometer as claimed in claim 8, wherein said clamping ring completely covers said uprights.

10. An accelerometer as claimed in claim 7, wherein said securing means comprises a bolt extending through the uprights, the piezoelectric elements and the seismic masses, said bolt having a thread upon which a nut having a thread is screwed to produce said pressure.

11. An accelerometer as claimed in claim 1, wherein the piezoelectric element and the seismic mass are retained between the uprights by means of glue.

12. An accelerometer as claimed in claim 1, wherein said uprights extend downward from a cover plate and said base has an upward extending cylindrical housing serving as a clamping ring and a cover for said downward extending uprights, said piezoelectric elements and said seismic masses being arranged between said uprights.

13. An accelerometer as claimed in claim 1, wherein one of said seismic masses is positioned along a vertical axis of said accelerometer, said one of said seismic masses having an inner cylindrical wall provided along said vertical axis for inserting a mounting bolt therethrough.

14. An accelerometer as claimed in claim 1, wherein one of said seismic masses has a top plate formed integral thereto.

15. An accelerometer as claimed in claim 1, wherein said at least one seismic mass has a cross-sectional shape formed as a circle with parallel cut segments.

16. An accelerometer as claimed in claim 10, wherein said bolt is screwed into a thread in one of said uprights.

17. An accelerometer as claimed in claim 1, wherein one of said seismic masses has a top plate secured thereto.

* * * * *